(12) United States Patent
Songer et al.

(10) Patent No.: US 8,504,100 B2
(45) Date of Patent: Aug. 6, 2013

(54) SYSTEM AND METHOD FOR MULTI-RADIO CONTROL

(75) Inventors: Christopher M. Songer, Louisville, KY (US); Gene M. Chang, Louisville, KY (US); Peter E. Groset, Carlsbad, CA (US); Patrick C. Lankswert, Louisville, KY (US)

(73) Assignee: ConnectSoft, Inc., Louisville, KY (US)

( * ) Notice: Subject to any disclaimer, the term of this patent is extended or adjusted under 35 U.S.C. 154(b) by 1277 days.

(21) Appl. No.: 11/751,903

(22) Filed: May 22, 2007

(65) Prior Publication Data
US 2007/0275683 A1 Nov. 29, 2007

Related U.S. Application Data

(60) Provisional application No. 60/883,777, filed on Jan. 6, 2007, provisional application No. 60/802,595, filed on May 23, 2006.

(51) Int. Cl.
*H04M 1/00* (2006.01)

(52) U.S. Cl.
USPC ............... 455/552.1; 455/435.1; 455/435.2; 455/432.1; 370/328; 370/338; 370/331; 709/229; 713/168

(58) Field of Classification Search
USPC 455/185.1, 403, 410–411, 418, 432.1–432.3, 455/435.1–435.3, 436–444, 445, 552.1; 370/328, 331, 338; 713/168, 169; 709/229
See application file for complete search history.

(56) References Cited

U.S. PATENT DOCUMENTS 6,628,965 B1 9/2003 LaRosa et al.
6,801,777 B2 10/2004 Rusch
(Continued)

FOREIGN PATENT DOCUMENTS

CN 1539247 A 10/2004
CN 1618208 A 5/2005
(Continued)

OTHER PUBLICATIONS

ISA/US, International Search Report and Written Opinion for International Application No. PCT/US07/69519, mailed Feb. 13, 2008.
(Continued)

*Primary Examiner* — Kamran Afshar
*Assistant Examiner* — Marisol Fahnert
(74) *Attorney, Agent, or Firm* — Stites & Harbison PLLC; Jeffrey A. Haeberlin; David W. Nagle, Jr.

(57) ABSTRACT

A system and method for multi-radio control unifies disparate radio technologies and communication protocols and abstracts them such that a user of a personal electronic device having a plurality of disparate radios is not required to know or understand the radio technology needed to connect to a remote wireless device or service. An intermediate layer receives requests from a user interface application, generates specific driver commands to each radio, and returns information received from each radio to the user interface application module. A user interface application module initiates a search for available remote wireless devices, provides the user with information regarding the available remote wireless devices, and establishes a connection to an available remote wireless device in response to a user selection. The user interface application module also presents notifications to the user, and also handles disconnect requests and security credential dialogs.

20 Claims, 12 Drawing Sheets

U.S. PATENT DOCUMENTS

| | | | |
|---|---|---|---|
| 7,657,287 | B2 | 2/2010 | Hausner et al. |
| 2002/0059434 | A1 | 5/2002 | Karaoguz et al. |
| 2003/0046586 | A1 | 3/2003 | Bheemarasetti et al. |
| 2003/0100308 | A1* | 5/2003 | Rusch ............... 455/445 |
| 2003/0236890 | A1 | 12/2003 | Hurwitz et al. |
| 2004/0037295 | A1* | 2/2004 | Tanaka et al. ......... 370/395.53 |
| 2004/0120421 | A1 | 6/2004 | Filipovic |
| 2004/0162027 | A1* | 8/2004 | Chang ............... 455/41.2 |
| 2004/0192221 | A1 | 9/2004 | Matsunaga |
| 2004/0248550 | A1* | 12/2004 | Hausner et al. ............ 455/410 |
| 2005/0020238 | A1* | 1/2005 | Eastman et al. ............ 455/403 |
| 2005/0159180 | A1 | 7/2005 | Cheng et al. |
| 2006/0026289 | A1* | 2/2006 | Lyndersay et al. ........... 709/227 |

FOREIGN PATENT DOCUMENTS

| | | |
|---|---|---|
| JP | 2004-304399 | 10/2004 |
| WO | 03047177 A1 | 6/2003 |

OTHER PUBLICATIONS

IPEA/US, International Preliminary Report on Patentability for International Application No. PCT/US07/69519, completed May 25, 2010.

Japanese Patent Office, Office Action issued in corresponding Japanese Patent Application No. 2009-512279, mailed Aug. 21, 2012.

EPO, Extended Search Report issued in corresponding European Patent Application No. 07797671.0, dated Nov. 30, 2012.

Japanese Patent Office, Office Action issued in corresponding Japanese Patent Application No. 2009-512279, mailed Mar. 6, 2012.

Knutson et al., "Dynamic Autonomous Transport Selection in Heterogeneous Wireless Environments," Wireless Communications and Networking Conference/IEEE Communications Society, Mar. 25, 2004, vol. 2, pp. 689-694.

State Intellectual Property Office of the People's Republic of China, Office Action issued in corresponding Chinese Application No. 200780027033.3, on Apr. 25, 2012.

Israel Patent Office, Office Action issued in corresponding Israeli application No. 195462, dated May 21, 2012.

The Patent Office of Israel, Notification of Defects in Patent Application No. 195462 issued in corresponding Israeli Patent Application No. 195462, dated May 23, 2013.

Toshiba, "Tech Insight: ConfigFree," available at http://uk.computers.toshiba-europe.com/Contents/Toshiba_uk/En/Others/easyguard/Tech-Insight-ConfigFree-EN%20UK.pdf, downloaded Jun. 6, 2013.

* cited by examiner

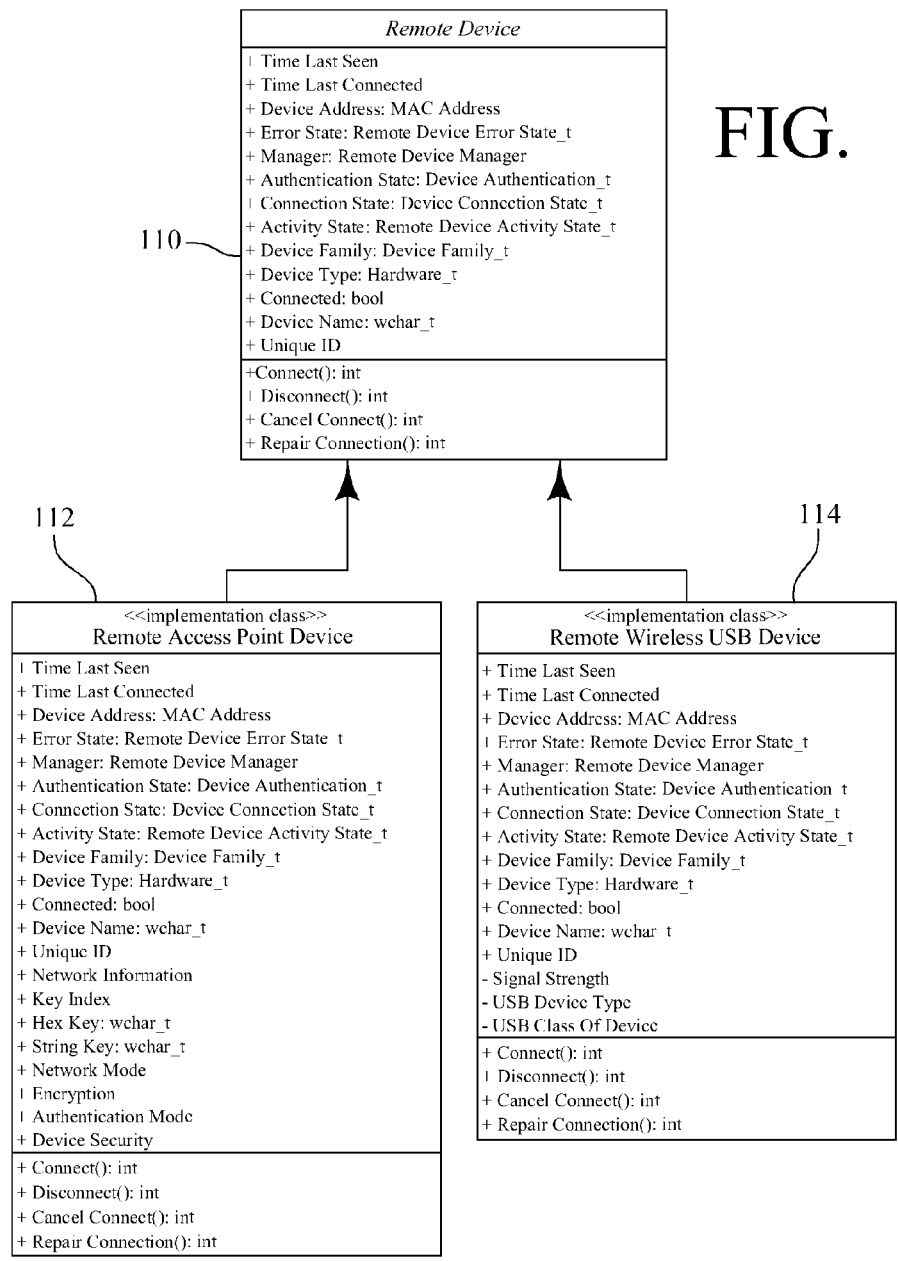

SYSTEM AND METHOD FOR MULTI-RADIO CONTROL

CROSS-REFERENCE TO RELATED APPLICATIONS

This application claims priority to U.S. Provisional Patent Application No. 60/883,777, filed Jan. 6, 2007, and to U.S. Provisional Patent Application No. 60/802,595, filed May 23, 2006, the entire disclosures of which are incorporated herein by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to the control of multiple wireless radios of differing radio types contained in a single computing device, such as a desktop personal computer, a laptop personal computer, a personal digital assistant (PDA), or the like.

2. Description of Prior Art

As shown in FIG. 1, a personal electronic device 10, such as personal computer (PC), personal digital assistant (PDA), or cellular phone may have disparate radios 11a-11e using disparate radio technologies and communication protocols in an environment having remote wireless devices 14a-14p. The remote wireless devices 14a-14p are accessible through the radios 11a-11e using the disparate radio technologies.

For instance, as shown, the personal electronic device 10 may have a GSM/CDMA cellular radio 11a, a Wi-Fi (IEEE 802.11) radio 11b, a UWB (Ultra-wide Band) radio 11c, a Bluetooth radio 11d, and another radio 11e that represents future radios having unforeseen but equivalent wireless communication technologies. The remote wireless devices may include: a cellular network 14a; a first access point 14b and a second access point 14c using Wi-Fi technology; a third access point 14d, a fourth access point 14e, a wireless USB hub 14f, a PDA 14g, a first printer 14h, a first computer 14i, an first input device 14j, and a first audio device 14k using UWB technology; a second computer 14l, a second input device 14m, and a second printer 14n using Bluetooth technology; and a remote wireless device 14p that represents future remote wireless devices using unforeseen but equivalent radio technology.

Each individual radio 11a-11e has an individual utility that is used to manage and control the radio. This is largely a result of the local radio types having different physical (PHY) layers, different medium access control (MAC) portions of the data link layer (DLL), and, therefore, different device drivers and different utilities (user interface applications) on the personal electronic device for control of the local wireless radios. Users get confused because they don't know which utilities they are to use to manage and control which radio in order to use a remote wireless device. Thus, there is a need for a single utility that can be used with all of the local radios 11a-11e, to eliminate the need for a user to know what radio technology is being used to access remote wireless devices 14a-14p, and allow the user to identify the remote wireless device that they wish to use without regard to the radio or technology used to access the remote device or the utility used to control the radio.

Further, the software developer that is developing applications that utilize the local wireless radios to connect to remote wireless devices must currently use different command structures to perform similar generic functions (such as find devices, connect/disconnect devices, set security, etc.). Again, this condition is the result of the different radio types having fundamentally different interfaces on multiple levels. Thus, there is a need for a utility that allows developers to treat different wireless radio types generically, and to allow third-party applications to access the functionality of such a utility.

SUMMARY OF THE INVENTION

These needs and others are met by a system and method for multi-radio control described herein, which, advantageously, unifies disparate radio technologies and communication protocols and abstracts them such that a user of a personal electronic device having a plurality of disparate radios wishing to make use of a remote wireless device or service is not required to know or understand the radio technology needed to connect to the given device.

According to an aspect of the invention, a system for multi-radio control in a personal electronic device includes: a program interface module for receiving requests regarding the remote wireless devices and providing responses to the requests; a local hardware manager module for receiving requests from the program interface module, formatting generic hardware interface requests for each radio, receiving generic responses to the generic hardware interface requests, and providing the responses to the program interface module; and an adaptation layer module associated with each radio. Each adaptation layer module receives the generic hardware interface requests from the local hardware manager module, generates specific driver commands to the associated radio driver modules based on the generic hardware interface requests, sends the specific driver commands to the associated radio driver modules, receives specific responses from the radio driver modules, generates generic responses based on the specific responses, and provides the generic responses to the local hardware manager module.

The system may also include a remote device manager module and a user interface application module. The remote device manager module is for managing remote device objects for available remote wireless devices. The user interface application module is for: receiving a request from a user to change the connection status (i.e. connect/disconnect) of at least one of the available remote wireless devices; sending the request to change the connection status of the at least one of the available remote wireless devices to the program interface module; receiving a response to the request to change the connection status of the at least one of said remote wireless devices from the program interface module; and presenting the response to the user. Additionally, the user interface application module is also for receiving notifications of changes in connection status that were not initiated by the user (i.e. an unexpected disconnect event), and presenting those notifications to the user.

Correspondingly, according to another aspect of the invention, a method for multi-radio control in a personal electronic device includes: searching for remote wireless devices available to each radio of the plurality of radios in response to receiving an instruction from a user to search for available remote wireless devices; presenting information as to available remote wireless devices to the user in response to receiving information indicating the remote wireless devices that are available; and establishing a connection with at least one of the remote wireless devices in response to receiving a request from said user to establish a connection with the selected remote wireless devices.

The method may further include: formatting a generic hardware interface request to search for available remote wireless devices; generating specific driver commands to each radio to search for available remote wireless devices based on the generic hardware interface request; sending the specific driver commands to a radio driver module associated with each radio; and receiving information indicating available remote wireless devices to each radio from each radio driver module.

Additionally, the method may further include: receiving a disconnect request from the user and disconnecting a remote wireless device in response; receiving a notification of a change in state of the connection and presenting the notification to the user; and determining that security credentials are required to access a remote wireless device and requesting/receiving such security credentials from the user.

Better understanding may be had by referring to the following detailed description of exemplary embodiments and drawings.

BRIEF DESCRIPTION OF THE DRAWINGS

FIG. 10 is a class diagram for an exemplary remote device manager module of the intermediate layer module of FIG. 6.

FIG. 11 is a class diagram for exemplary remote device objects of the intermediate layer module of FIG. 6.

DESCRIPTION OF EXEMPLARY
EMBODIMENTS OF THE INVENTION

According to an exemplary embodiment of the invention, disparate radio and network technologies are unified and abstracted such that a user wishing to make use of a remote wireless device or service is not required to know or understand the radio technology needed to connect to the given device. This is achieved by replacing multiple individual utilities that were previously used to manage individual radios with a single utility that understands each of the underlying radios. This provides a singular user experience where the user can find, connect and access remote wireless devices and services on any radio using the same methods.

A. Logical Software Layers

Figure 1:
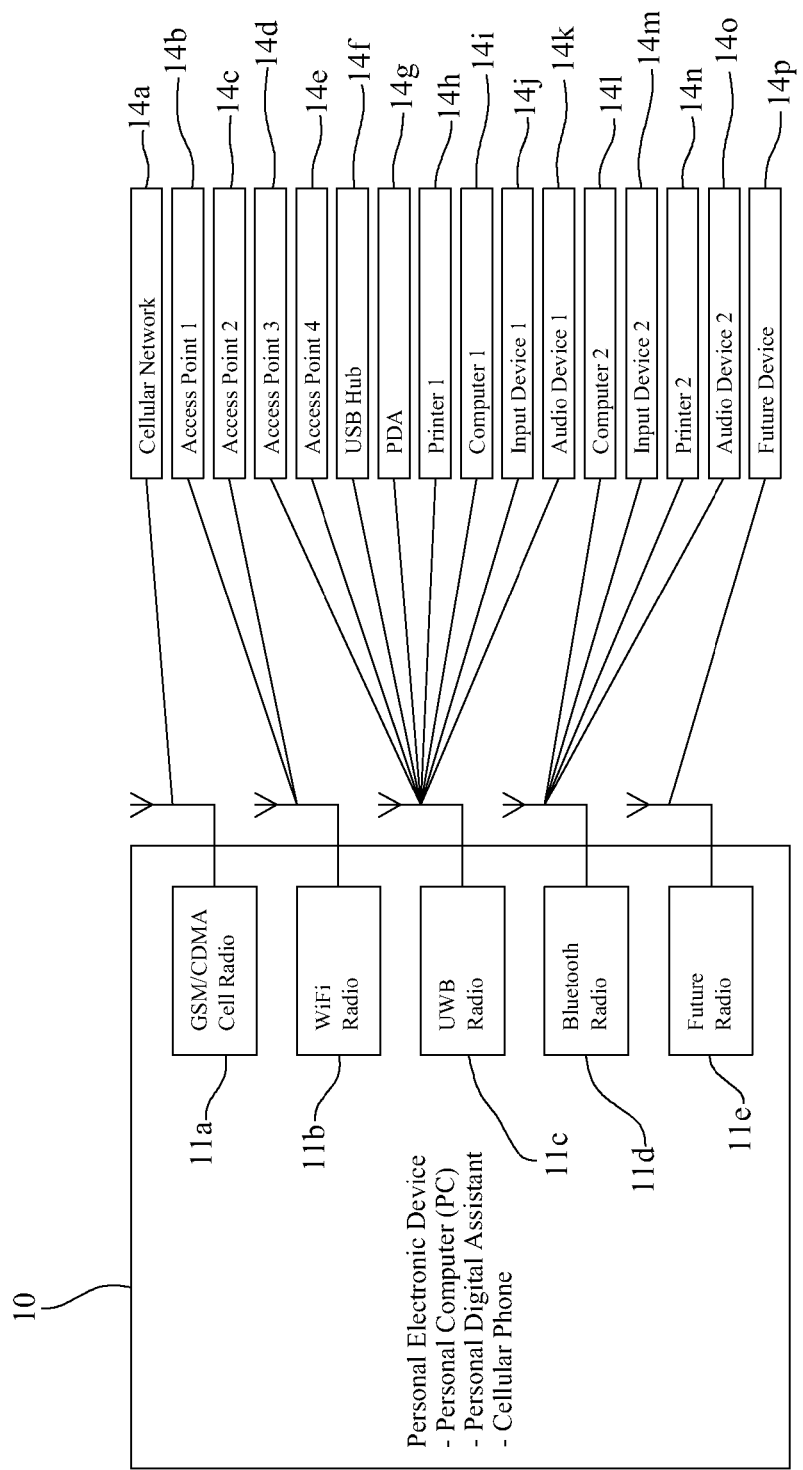
FIG. 1 is block diagram of a personal electronic device having disparate radios using disparate radio technologies and communication protocols in an environment having remote wireless devices accessible through the radios using the disparate radio technologies.
Figure 2:
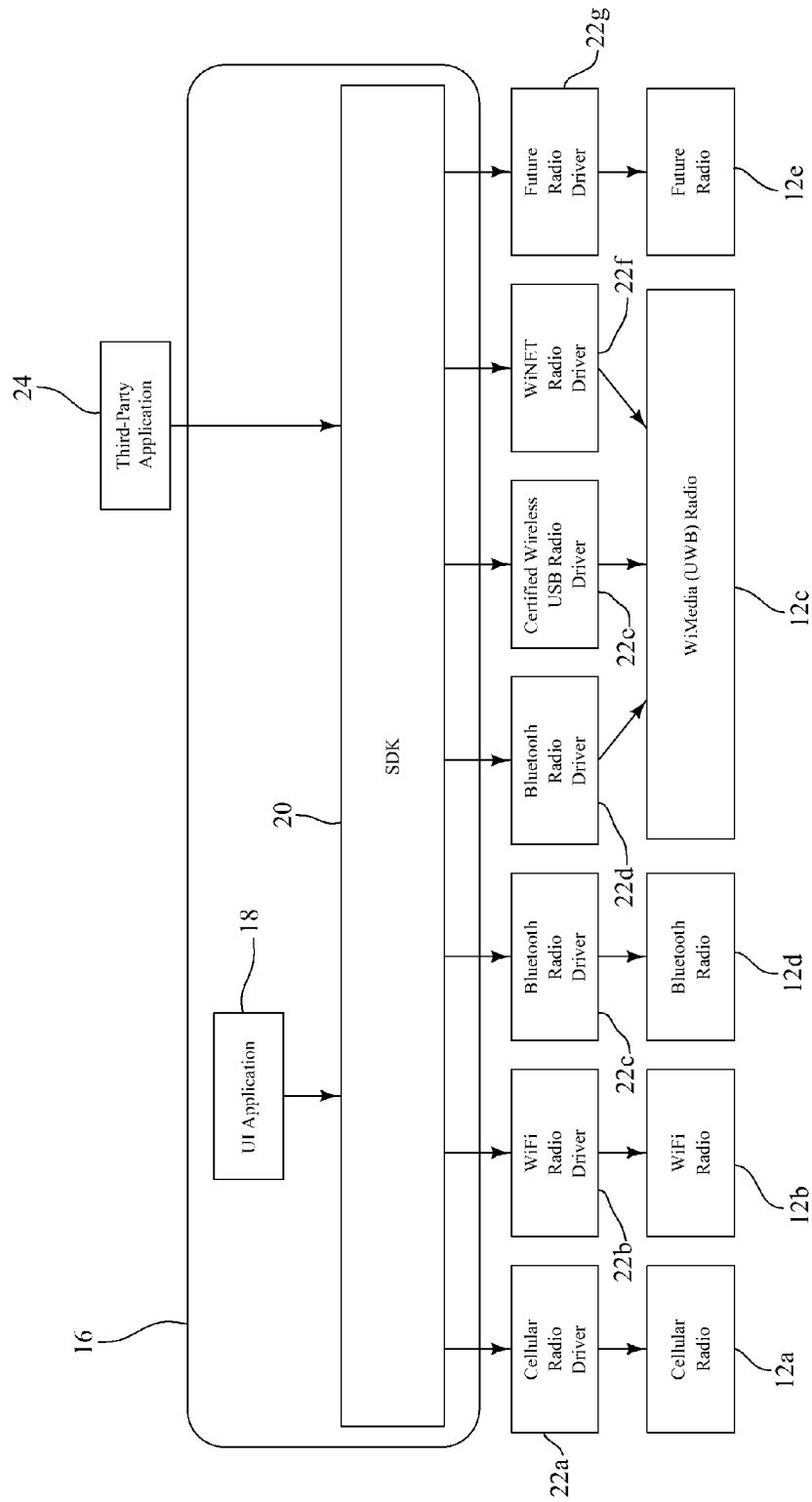
FIG. 2 is a functional block diagram of an exemplary system for multi-radio control according to the invention.

FIG. 2 is a functional block diagram of an exemplary system 16 for multi-radio control according to the invention, including a User Interface (UI) application module 18 and an intermediate layer object or module (software development kit (SDK)) 20. Also shown are: local radios 12a-12e, radio driver modules 22a-22g for each of the local radios 12a-12e, and a third-party application 24. The User Interface application module 18 provides a single, uniform interface to a user allowing the user to find and use remote wireless devices (e.g. FIG. 1: 14a-14p). The intermediate layer module 20 serves to translate or adapt instructions and notifications between the user interface application module 18 and the radio driver modules 22a-22g for each of the local radios 12a-12e. Additionally, the intermediate layer module 20 allows applications, such as third party application 24, to use the instruction and notification adaptation functions of the intermediate layer module 18 to communicate with and control the radio driver modules 22a-22g.

It should be noted that the radio driver modules 22a-22g represent software modules that control the operations specific to each radio 12a-12e. These software modules may take the form of stacks, device drivers and operating system programming interfaces, and the use of the term "driver" in the radio driver modules 22a-22g in not intended to be a limitation on the scope of the claimed invention. It should also be noted that the radio driver modules 22a-22g are typically provided by the radio hardware manufacturer.

Additionally, it should be understood that the implementation of the exemplary embodiment of the invention described herein is through object-oriented software, and, therefore the components of the intermediate layer (SDK) object 20, described below, are themselves objects. However, a skilled practitioner will recognize that the functions of the objects could be accomplished by alternate functional and structural implementations. Therefore, some of the "objects" of the exemplary implementation will be described as "modules," and it should be understood that, for the purposes of this description and the claims that follow, the terms "objects" and "modules" refer to any structural and functional implementations of the software objects described herein.

B. User Interface Application

Figure 3:
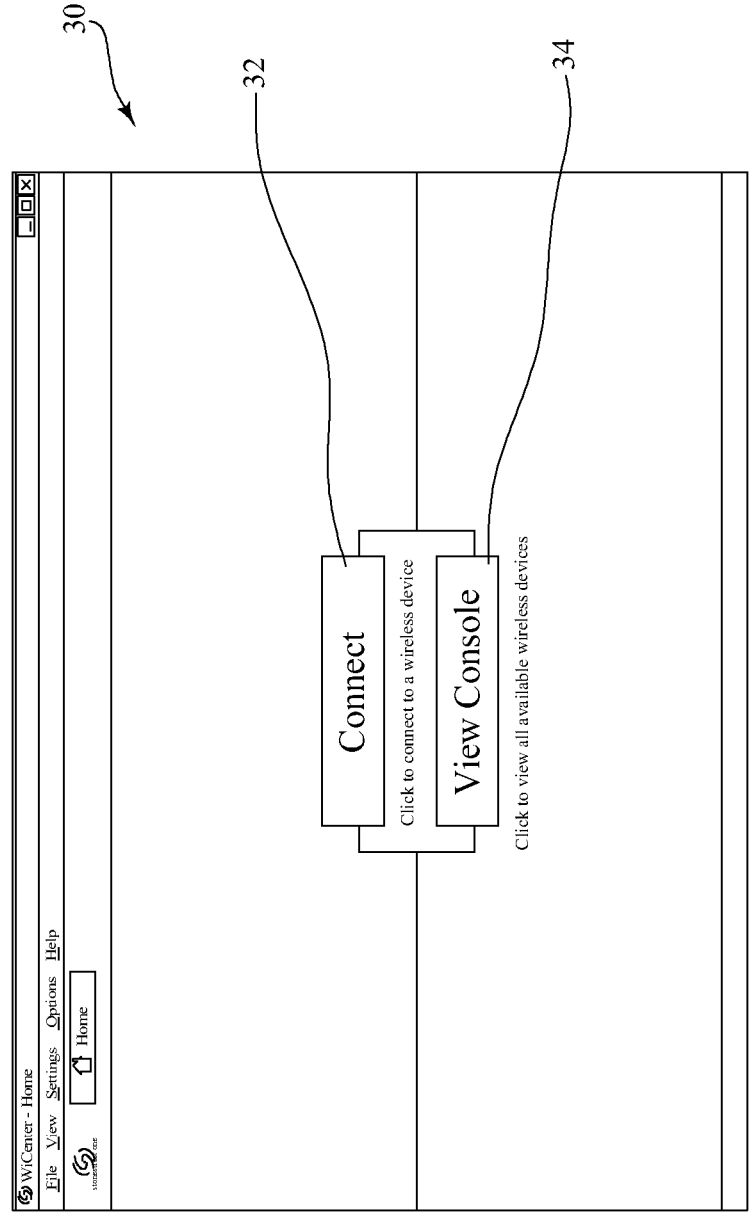
FIG. 3 is a screen shot of an Initial screen of an exemplary User Interface application module of the exemplary system of FIG. 2.
Figure 4:
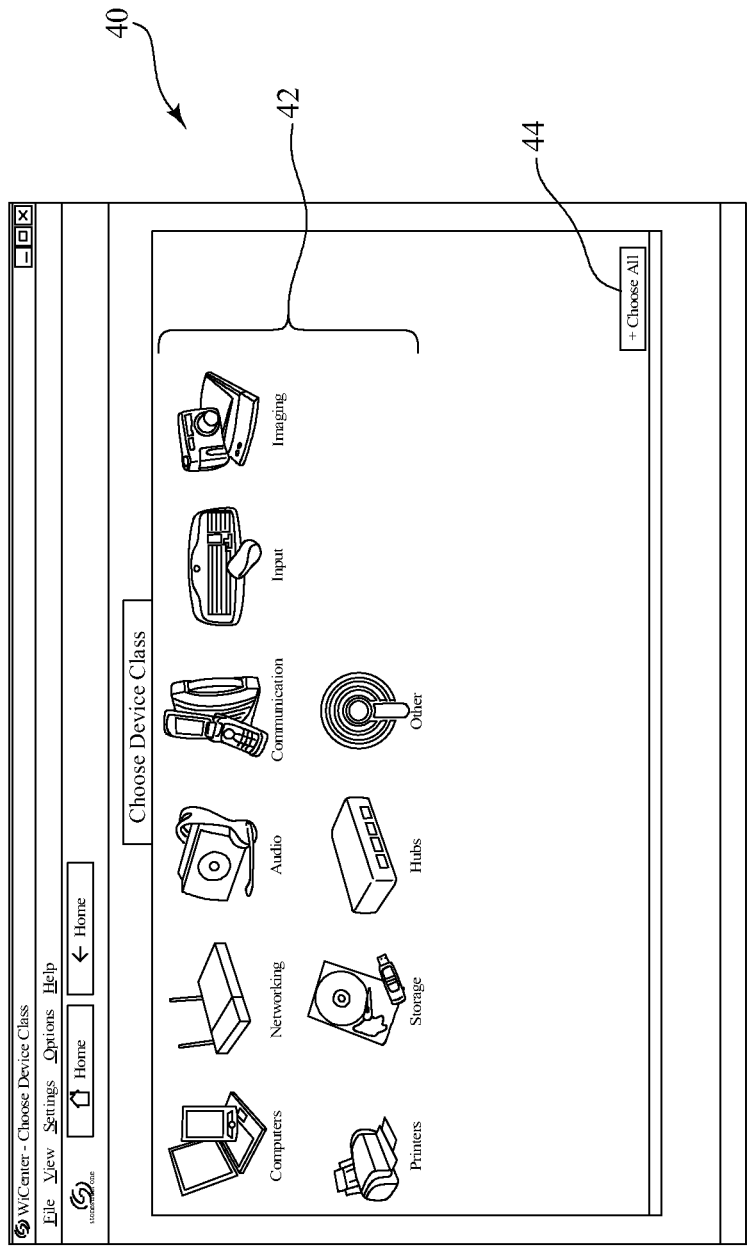
FIG. 4 is a screen shot of an Connection Wizard screen of an exemplary User Interface application module of the exemplary system of FIG. 2.
Figure 5A:
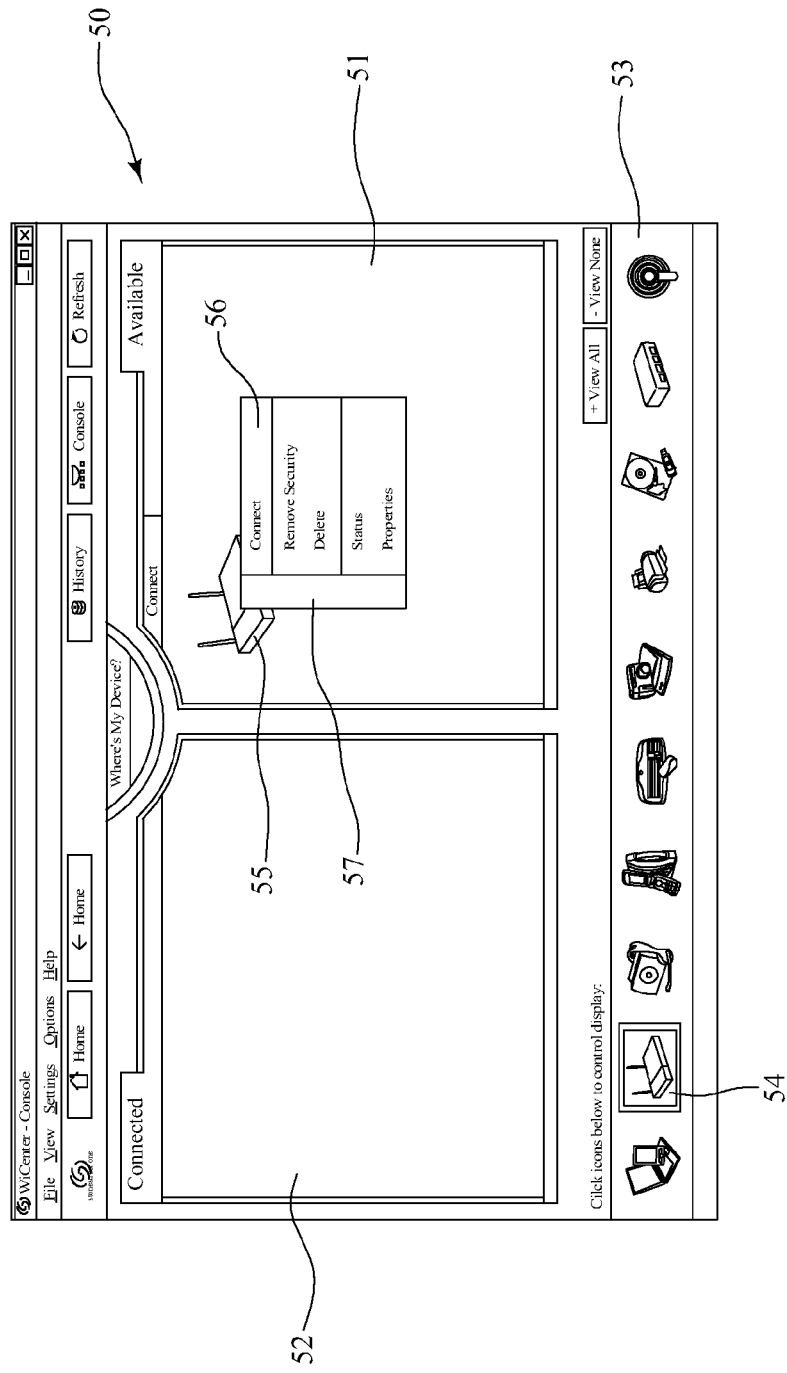
FIG. 5A is a screen shot of an Console screen of an exemplary User Interface application module of the exemplary system of FIG. 2.
Figure 5B:
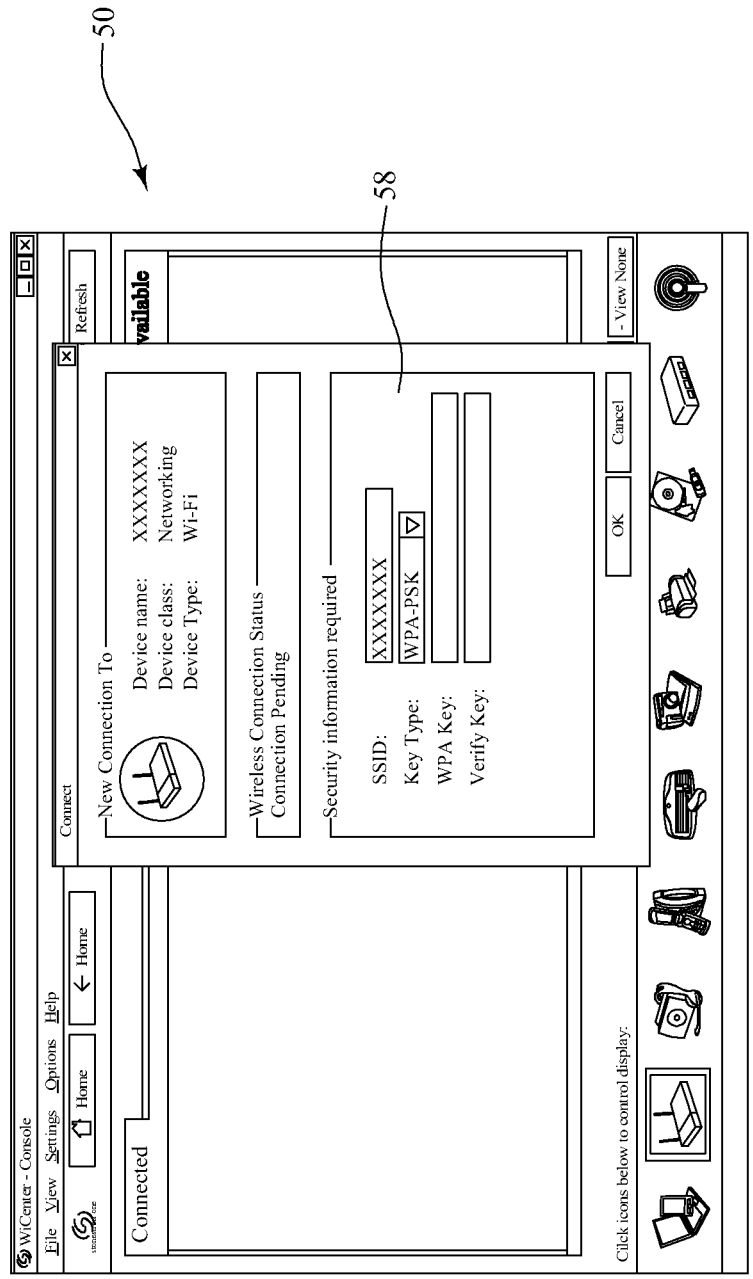
FIG. 5B is a screen shot of the Console screen of FIG. 5A, with an exemplary security credential dialog window presented thereon.

FIG. 3 through FIG. 5B are screen shots of screens from an exemplary User Interface (UI) application module. FIG. 3 is an Initial screen 30. FIG. 4 is a Connection Wizard screen 40. FIG. 5A is a Console screen 50. FIG. 5B is a screen shot of the Console screen 50 with an exemplary security credential dialog window 58 presented thereon.

The Initial screen 30 (FIG. 3) provides a user with a choice of using a connection wizard interface of the Connection Wizard screen (FIG. 4) by selecting a Connect button 32, or going directly to the Console screen 50 (FIG. 5A) by selecting a View Console button 34.

The Connection Wizard screen 40 (FIG. 4) provides the user with a set of device class icons 42 representing a number of remote wireless device classes to allow the user to narrow the available remote wireless devices to only devices of a certain class. Selection of one of the device class icons initiates a search across all local radios for remote wireless devices that are devices of the selected class, and takes the user to the Console Screen 50 (FIG. 5A) to display the available remote wireless devices of the selected class. Additionally, a "Choose All" button 44 will take user to the Console Screen 50 (FIG. 5A) where all available devices are presented without filtering the available devices by device class.

The Console screen 50 (FIG. 5A) is subdivided into an Available window 51, a Connected window 52, and a Display Control window 53. The Available window 51 provides a display of icons representing the available remote wireless devices. If the Console screen 50 is displayed as a result of the user selecting the View Console button 34 of the Initial screen 30 (FIG. 3), all available remote wireless devices are presented in the Available window 51. However, if the Console screen 50 is displayed as a result of the user selecting a particular device class icon of the Connection Wizard screen 40 (FIG. 4), only remote wireless devices of the selected device class will be displayed in the Available window 51, and an icon corresponding to the selected device class is highlighted in the Display Control window 53.

In the exemplary Console screen 50, an "access point" device class has been selected. An "access point" icon 54 in the Display control window 53 is highlighted, and a single available remote access point device is indicated by an access point icon 55 in the Available window 51. Advantageously, the single available remote access point device is identified and displayed without regard to the local radio or the local radio technology that is used to communicate with the available remote access point, so that the user does not need to know or be concerned with the details of the local radio or local radio technology.

To initiate a connection with an available remote wireless device, such as the single available remote access point device, using the exemplary User Interface (UI) application 18, the user may: 1) drag and drop the access point icon 55 from the Available widow 51 to the Connected window 52; 2) double-click the access point icon 55; or 3) right-click on the access point icon 55 and click a "connect" menu item 56 on a pop-up menu 57 that opens as a result of the right-click action.

To disconnect from a connected device, the user may: 1) drag and drop the device icon from the Connected window 52; or 2) right-click on the device icon and click a "disconnect" menu item on a pop-up menu that opens as a result of the right-click action.

Changes in connection status are displayed by: 1) moving the device icon between the Connected window 52 and the Available window 51; and 2) displaying a message in the lower right-hand corner of the screen (especially useful when the display for the User Interface (UI) application 18 is minimized).

FIG. 5B is a screen shot of the Console screen 50 with an exemplary security credential dialog window 58 presented thereon. If the remote device, such as the available remote access point device, requires security credentials, or if a service offered by the device requires security credentials, a security credential dialog window, such as the exemplary security credential dialog window 58 of FIG. 5B is presented to allow the user to enter their security credentials.

C. Intermediate Layer (SDK) Hierarchical Constructs

Figure 6:
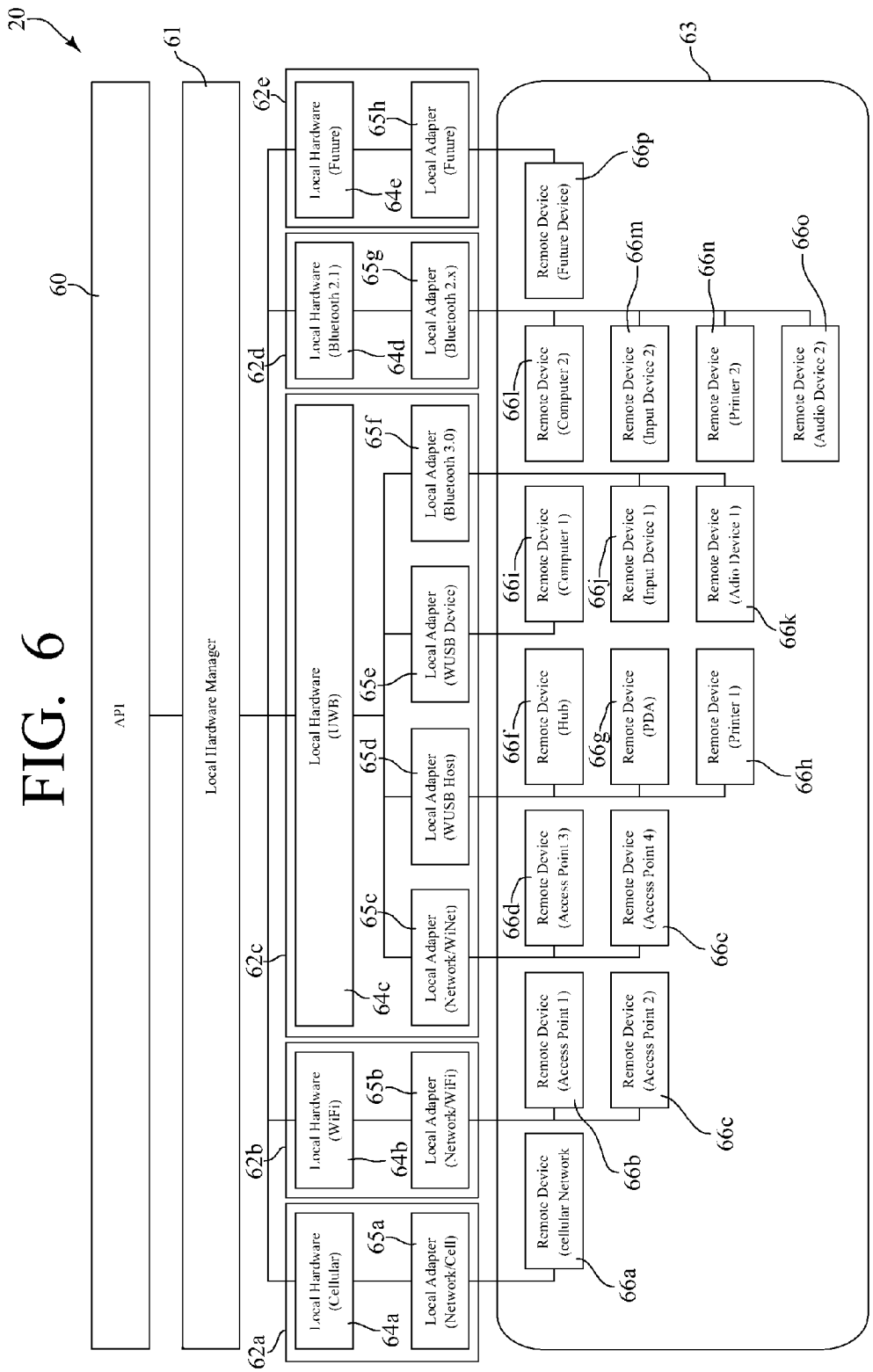
FIG. 6 is a hierarchical constructs diagram of an intermediate layer module of the exemplary system of FIG. 2.

FIG. 6 is a hierarchical constructs diagram of the intermediate layer (SDK) object or module 20. As shown, the intermediate layer module 20 has a program interface (Application Program Interface (API)) module 60, a local hardware manager module 61, adaptation layer modules 62a-62e, and a remote device manager module 63. Each of the adaptation layer modules 62a-62e is comprised of a local hardware object 64a-64e for each radio (corresponding to each physical radio 12a-12e (FIG. 2)) and a local adapter object 65a-65h for each distinct communication protocol supported by each radio. Remote device objects 66a-66p are instantiated for each available remote wireless device (e.g. corresponding to remote wireless devices 14a-14p of FIG. 1).

The program interface (API) module 60 exposes the functionality of the intermediate layer (SDK) module 20 to the UI application module 18 and to third party applications 24, which includes the basic functions of: enumerate available remote wireless devices, connect/disconnect remote devices, and notification (including connection events, disconnection events, security events and error/warning events). Other functions of the intermediate layer (SDK) module 20 as described below are also exposed through the program interface (API) module 60.

The local hardware manager module 61 maintains a collection of objects representing the local radios (i.e. the radios 12a-12e of FIG. 1) and provides collection-level services for operations that are to be performed over the entire collection (i.e. get remote devices, disconnect all remote devices, turn power off to all local radios (i.e. "flight mode")). As such, the local hardware manager module receives requests from the program interface (API) module 60, formats generic hardware interface requests for each radio, receives generic responses from in response to the generic hardware interface requests, and provides the responses to the program interface (API) module 60.

Figure 7:
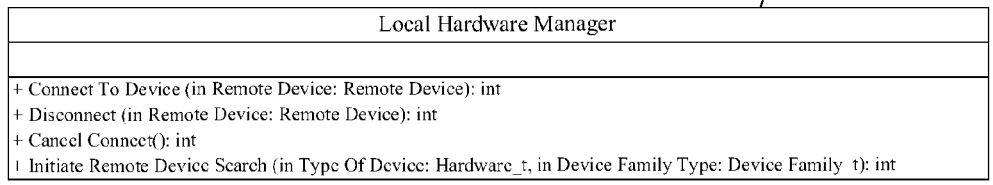
FIG. 7 is a class diagram for an exemplary local hardware manager module defining an abstract class of the intermediate layer module of FIG. 6.

FIG. 7 is a class diagram for an exemplary local hardware manager module (e.g. 61, FIG. 6) which defines an abstract local hardware manager class 70, including abstract operations. Exemplary attribute and operation descriptions for the local hardware manager class 70 are contained in Table 1.

TABLE 1

| | |
|---|---|
| LocalHardwareManager::ConnectToDevice(RemoteDevice) | Will connect the local radio to the remote device in the object. The function will check the wireless type in the RemoteDevice. It will then decide which adaptation layer module to use. |
| LocalHardwareManager::Disconnect(RemoteDevice) | Disconnects the local radio to the remote device in the object. The function will check the wireless type in the RemoteDevice. It will then decide which adaptation layer module to use. |

TABLE 1-continued

| | |
|---|---|
| LocalHardwareManager::CancelConnect( ) | Will send a cancel to the connection process for the passed in the hardware type. |
| LocalHardwareManager::InitiateRemoteDeviceSearch (TypeOfDevices, DeviceFamilyType) | Starts a remote device search using the TypeOfDevices and SharedProfileType filter. The hardware type passed in can be an OR of all the defined hardware types. |
| LocalHardwareManager::ConnectToDevice(RemoteDevice) | Will connect the local radio to the remote device in the object. The function will check the wireless type in the RemoteDevice. It will then decide which adaptation layer module to use. |

Returning to FIG. 6, the adaptation layer modules 62a-62e receive the generic hardware interface requests from the local hardware manager module 61 and generate specific driver commands to their associated radio driver modules based on the generic hardware interface requests. The adaptation layer modules 62a-62e then send the specific driver commands to the associated radio driver modules (e.g. 22a-22g, FIG. 2), receive specific responses from the radio driver modules, and generate generic responses based on the specific responses. The adaptation layer modules 62a-62e provide the generic responses to the local hardware manager module 61.

As mentioned, each of the adaptation layer modules 62a-62e is comprised of a local hardware object 64a-64e for each radio (corresponding to a physical radio 12a-12e (FIG. 2)) and a local adapter object 65a-65h for each distinct communication protocol supported by each radio. For example, Ultra-wide Band (UWB) technology allows a single radio (e.g. 12c, FIG. 2) to operate using a number of communication protocols (e.g. Bluetooth 3.0 (e.g. 22d, FIG. 2), Wireless USB Host (e.g. 22e, FIG. 2), Wireless USB Device (e.g. 22e, FIG. 2), and WiNet (e.g. 22f, FIG. 2) protocols). The local hardware objects 64a-64e provide physical radio characteristics and functions, such as the MAC address and enable/disable. The local adapter objects 65a-65h provide communication protocol characteristics and functions, such as device name, friendly name, get devices, and connect/disconnect remote device. Class attributes and operations for the adaptation layer modules 62a-62e also provide a "handle" for the program interface (API) module 60 to call directly to the adaptation layer modules 62a-62e.

Figure 8:
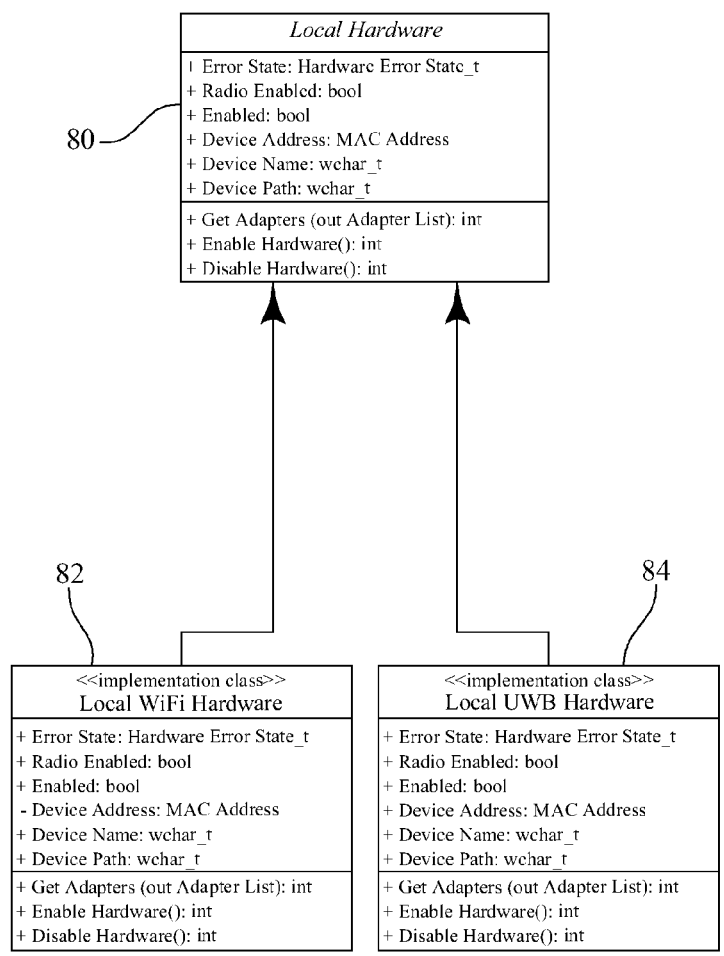
FIG. 8 is a class diagram for an exemplary local hardware object of the intermediate layer module of FIG. 6.

FIG. 8 is a class diagram for local hardware objects (e.g. 64a-64e, FIG. 6), including definitions of an abstract local hardware class 80, an exemplary concrete local WiFi hardware class 82, and an exemplary concrete local UWB hardware class 84. Exemplary attribute and operation descriptions for the local hardware class 80 are contained in Table 2.

TABLE 2

| | |
|---|---|
| LocalHardware::DeviceAddress | The device address of the LocalHardware object to the given MacAddress_t structure. |
| LocalHardware::Enabled | If the LocalHardware is enabled, then the function returns TRUE, and FALSE otherwise. |
| LocalHardware::RadioEnabled | The radio enable status. TRUE: radio is enabled FALSE: radio is not enabled. |
| LocalHardware::ErrorState | The HardwareErrorState_t of the LocalHardware object, this function should only be called after receiving a callback that the LocalHardware object is within an error state. |
| LocalHardware::DeviceName | The device name to the user. |
| LocalHardware::DevicePath | The device path as identified by the device driver |
| LocalHardware::GetAdapters(DeviceList) | This function gets all children adapters of this LocalHardware. |
| LocalHardware::EnableHardware( ) | EnableHardware will use SetupDI*** functions in order to manually force the hardware to an actual Enabled state. This function should only be called if the Hardware is currently in a disabled state. |
| LocalHardware::DisableHardware( ) | Uses SetupDI*** functions in order to manually force the hardware to an actual Disabled state. This function should only be called if the Hardware is currently in an enabled state. |

Figure 9:
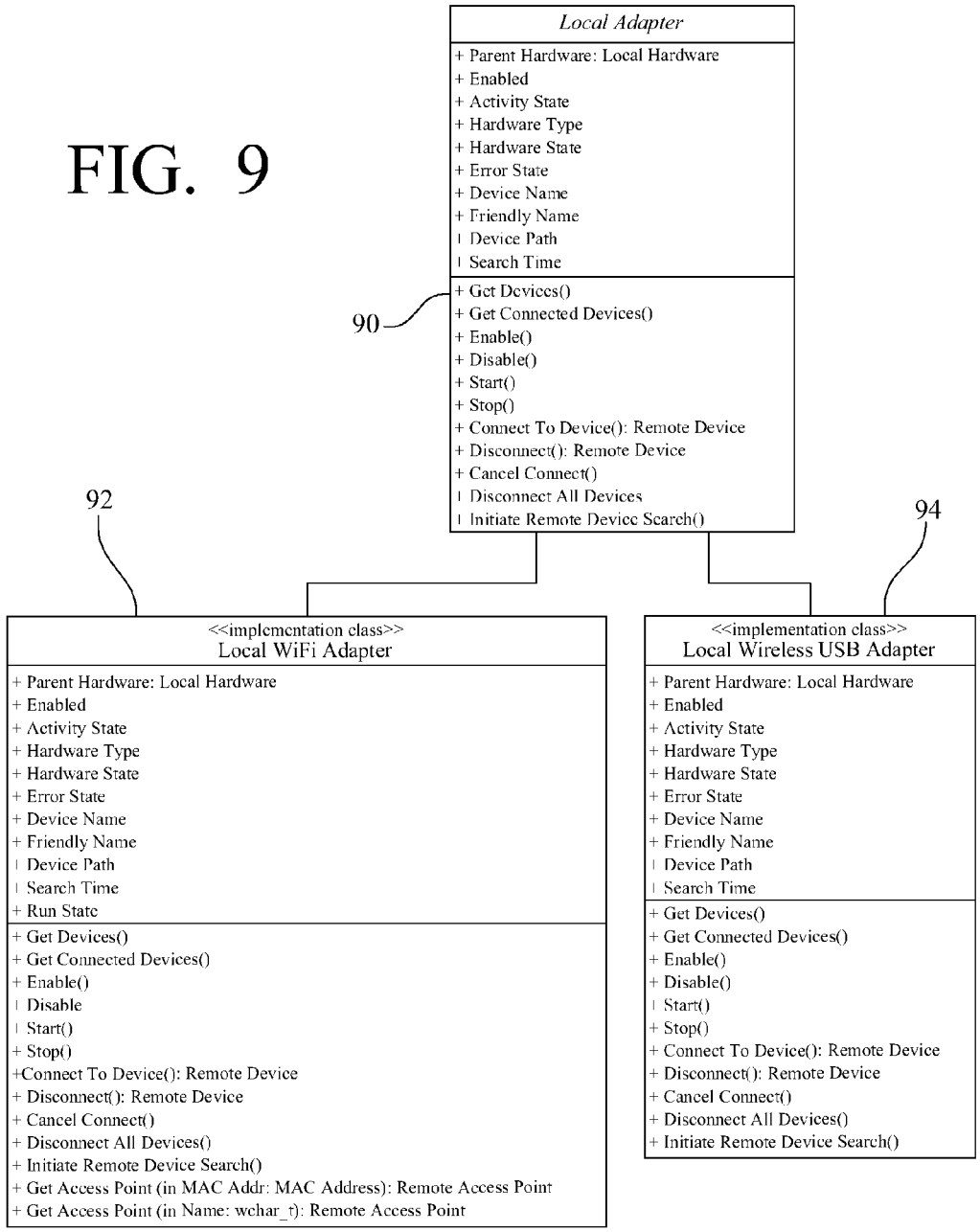
FIG. 9 is a class diagram class diagram for an exemplary local adapter object of the intermediate layer module of FIG. 6.

FIG. 9 is a class diagram for local adapter objects (e.g. 65a-65h, FIG. 6), including definitions of an abstract local adapter class 90, an exemplary concrete local WiFi adapter class 92, and an exemplary concrete local UWB hardware class 94. Exemplary attribute and operation descriptions for the abstract local adapter class 90 are contained in Table 3.

TABLE 3

| | |
|---|---|
| LocalAdapter::GetDevices(...) | Gets all devices connectable from this LocalAdapter |
| LocalAdapter::GetConnectedDevices(DeviceList) | Gets a list of connected devices, which have this LocalAdapter object as their parent hardware, and are connected. |
| LocalAdapter::ParentHardware | The Hardware associated with this local device |
| LocalAdapter::Enabled | If it is Hardware State of the LocalAdapter is HardwareState_Enabled, then the function returns TRUE, and FALSE otherwise. |
| LocalAdapter::ActivityState | The current Activity state for this LocalAdapter object |
| LocalAdapter::MaximumNumberOfConnectionsAllowed | The maximum number of connections allowed for the derived hardware type. |
| LocalAdapter::IsNewConnectionAllowed | Whether new connections are allowed |
| LocalAdapter::HardwareType | The hardware type of the local radio. |
| LocalAdapter::HardwareState | The HardwareState_t of the LocalAdapter object. |
| LocalAdapter::ErrorState | The HardwareErrorState_t of the LocalAdapter object, this function should only be called after receiving a callback that the LocalHardware object is within an error state. |
| LocalAdapter::DeviceName | The device name |
| LocalAdapter::FriendlyName | The friendly name for this device. |
| LocalAdapter::DevicePath | The device path |
| LocalAdapter::SearchTime | The amount of time the LocalAdapter object is going to take while performing a discovery. |
| LocalAdapter::EnableHardware( ) | Uses SetupDI*** functions in order to manually force the hardware to an actual Enabled state. This function should only be called if the Hardware is currently in a disabled state. |
| LocalAdapter::DisableHardware( ) | Uses SetupDI*** functions in order to manually force the hardware to an actual Disabled state. This function should only be called if the Hardware is currently in an enabled state. |
| LocalAdapter::Start( ) | Start is used to Start the WiCenterSDK managing this LocalAdapter object. This is when handles to communicate with the driver or device itself are opened. This function if successful will put the HardwareState of this ILocalAdapter object into an enabled state. |
| LocalAdapter::Stop( ) | Stop is used to Stop this WiCenterSDK from managing this LocalAdapter object. So all handles to the device and any ongoing activity with the device is halted, and no further communication with the device is attempted. This should put the HardwareState of this object into a disabled state. |
| LocalAdapter::ConnectToDevice(RemoteDevice) | ConnectToDevice is a base class pure virtual function that must be overridden by the derived class. The derived class will implement the hardware specific connect request. |
| LocalAdapter::DisconnectFromDevice(RemoteDevice) | Disconnect to device will disconnect the RemoteDevice pass to the function from the local hardware radio. This definition is for the base virtual class. |
| LocalAdapter::CancelConnect( ) | Used to cancel a connect attempt. If this function is called while the LocalAdapter object is attempting to connect to an RemoteDevice, then the connection attempt is to be stopped. |
| LocalAdapter::DisconnectAllDevices( ) | DisconnectAllDevices will disconnect all remote devices from the local hardware radio. This definition is for the base virtual class. |
| LocalAdapter::InitiateRemoteDeviceSearch( ) | InitiateRemoteDevice search is used to start a remote device search on this LocalAdapter object. This function will only be successful if we are within an Enabled Hardware State. This function will most likely spawn a thread to perform the search, and using callbacks to indicate any RemoteDevice objects that it discovers during the discovery process. |
| LocalAdapter::Unauthenticate(RemoteDevice) | This will unauthenticate with the specified RemoteDevice, which will remove any security information we have saved. |

Exemplary attribute and operation descriptions for the concrete local WiFi adapter class 92 are contained in Table 4.

TABLE 4

| | |
|---|---|
| LocalWiFiAdapter::WifiRunState | The current run state of this wifi device. |
| LocalWiFiAdapter::ConnectToDevice(RemoteDevice) | Attempts to Connect to the Remote Device object. All properties must be set on this device object before calling this function. This includes things like SSID, Encryption, Authentication, etc. This function will not block, because it creates a new thread. |
| LocalWiFiAdapter::CancelConnect( ) | Attempts to cancel any connection attempt that is currently ongoing. |
| LocalWiFiAdapter::DisconnectFromDevice(RemoteDevice) | Disconnects the RemoteDevice pass to the function from the local hardware radio. This definition is for the LocalWifiDevice. In the Wifi device, the remote device is not actually used in this call. |
| LocalWiFiAdapter::Disconnect( ) | Disconnects the local device from whichever remote access point is connected to it. This can be used when the remote device is unknown. |
| LocalWiFiAdapter::EnableHardware( ) | Uses SetupDI*** functions in order to manually force the hardware to an actual Enabled state. This function should only be called if the Hardware is currently in a disabled state. |
| LocalWiFiAdapter::DisableHardware( ) | Uses SetupDI*** functions in order to manually force the hardware to an actual Disabled state. This function should only be called if the Hardware is currently in an enabled state. |
| LocalWiFiAdapter::Stop( ) | Stop is used to Stop this WiCenterSDK from managing this LocalHardware object. So all handles to the device and any ongoing activity with the device is halted, and no further communication with the device is attempted. This should put the HardwareState of this object into a disabled state. |
| LocalWiFiAdapter::Start( ) | Start is used to Start the WiCenterSDK managing this LocalHardware object. This is when handles to communicate with the driver or device itself are opened. This function if successful will put the HardwareState of this LocalHarware object into an enabled state. |
| LocalWiFiAdapter::DisconnectAllDevices( ) | DisconnectAllDevices will disconnect all remote devices from the local hardware radio. This definition is for the LocalWifiDevice. |
| LocalWiFiAdapter::InitiateRemoteDeviceSearch( ) | InitiateRemoteDevice search is used to start a remote device search on this LocalHardware object. This function will only be successful if we are within an Enabled HardwareState. This function will most likely spawn a thread to perform the search, and using callbacks to indicate any RemoteDevice objects that it discovers during the discovery process. |
| LocalWiFiAdapter::PriorityList | The priority Device collection list for this device. |
| LocalWiFiAdapter::PriorityConnectionsEnabled | Whether the automatic priority connections are enabled. |
| LocalWiFiAdapter::IPAddress | The IP address associated with this wireless network card. |

Returning again to FIG. 6, the remote device manager module 63 is primarily a "container" for remote device objects 66a-66p containing the attributes of the available remote wireless devices. Thus, operations such as filter remote device list by class, and add/delete remote device are exemplary operations of the remote device manager module 63.

The remote device manager also prevents a single remote wireless device from being "seen" and presented multiple times in the available remote device presentation, by eliminating duplicate entries and implementing a predetermined preferred connection method logic. This situation might occur when a remote wireless device (e.g. 14a-14p, FIG. 1) itself has disparate radios using disparate radio technologies, and each of the remote wireless device radios is "seen" by a different radio (e.g. 12a-12e, FIG. 2).

FIG. 10 is a class diagram for an exemplary remote device manager module (e.g. 63, FIG. 6), which defines an abstract remote device manager class 100, including abstract operations. Exemplary attribute and operation descriptions for the remote device manager class 100 are contained in Table 5.

TABLE 5

| | |
|---|---|
| RemoteDeviceManager::GetDevices(Filter, DeviceList) | Return the devices to the user based on the filter. |
| RemoteDeviceManager::AddDevice(RemoteDevice) | Adds the given device to the internal vector of remote device objects. |
| RemoteDeviceManager::DeleteDevice(RemoteDevice) | Removes the given RemoteDevice object from our internal list of devices. This function will also delete the Remote Device. |

TABLE 5-continued

| | |
|---|---|
| RemoteDeviceManager::FindOrCreateDevice(HardwareType, RemoteDevice, DeviceParent, Options) | Creates a remote device object. It will first check to see if there is a device in the device list with the same address. If so, it will return the existing remote device. If not, it will create a new remote device object, insert it into the list, and return the object to the user. |
| RemoteDeviceManager::CreateNewDevice(HardwareType, RemoteDevice, DeviceParent)- | Creates a new device. This is used to create a device that wasn't discovered through a remote device search. This will usually be used for remote access points that do not broadcast their APs. The return device will be sent to the SDK using the callback. |

FIG. 11 is a class diagram for remote device objects (e.g. 66a-66p), including definitions of an exemplary abstract remote device class 110, an exemplary concrete remote Access Point device class 112, and an exemplary concrete remote Wireless USB device class 114. Exemplary attribute and operation descriptions for the remote device object class 110 are contained in Table 6.

TABLE 6

| | |
|---|---|
| RemoteDevice::TimeLastSeen | The time at which this device was last seen in any state except for Unknown. |
| RemoteDevice::TimeLastConnected | The time that this device was last in a connection state. |
| RemoteDevice::DeviceAddress | The Mac Address for this Remote Device object. Not all Wireless Remote Devices will have one. |
| RemoteDevice::ErrorState | The Remote Error State for this device. This should only be queried after the state is reported to be in error. |
| RemoteDevice::Manager | The Remote Device manager. |
| RemoteDevice::AuthenticationState | The current authentication state of the RemoteDevice. |
| RemoteDevice::ConnectionState | The current connection state of the RemoteDevice. |
| RemoteDevice::ActivityState | The current activity state of the RemoteDevice. |
| RemoteDevice::DeviceFamily | The DeviceFamily of the RemoteDevice. |
| RemoteDevice::DeviceType | The Hardware type of the RemoteDevice. |
| RemoteDevice::Connected | TRUE if the device has a Connected state |
| RemoteDevice::DeviceName | The RemoteDevice name |
| RemoteDevice::UniqueID | The UniqueID which represents this device. Since all wireless devices seem to have a different way to determine this uniqueness, this function has been made virtual. For instance, it can be: Mac Address, SSID, or CDID. Implemented in RemoteAccessPoint. |
| RemoteDevice::SignalStrength | The signal strength for this RemoteDevice. This function is virtual, because the mapping from the RSSI value to this SignalStrength_t enum is going to be different for every Remote Wireless Device type. |
| RemoteDevice::Disconnect( ) | Disconnects from this RemoteDevice object. |
| RemoteDevice::Connect( ) | Connects to this RemoteDevice object. This may not be possible on all Wireless Devices. |
| RemoteDevice::CancelConnect( ) | Used to cancel a connection. If this RemoteDevice is in a connecting state, then the connection will attempt to be stopped. A callback with the device connection state should be received after calling this, in order to indicate if the cancel attempt was successful. |
| RemoteDevice::RepairConnection( ) | Repairs a connection with this RemoteDevice object, this would normally be called when a user sees a connection problem, but for some reason we have not. This should essentially kill the existing connection, and attempt to reconnect if possible. |

Exemplary attribute and operation descriptions for the concrete remote Access Point device object class 112 are contained in Table 7.

TABLE 7

| | |
|---|---|
| RemoteAccessPoint::SignalStrength | The RSSI value as a standard enum, so all Remote Devices report a similar type of connection. |
| RemoteAccessPoint::DataTransferRate | The Data Transfer rate for this device. |

TABLE 7-continued

| | |
|---|---|
| RemoteAccessPoint::DeviceSecurity | This function will report if this RemoteAccessPoint is secure or not. The device will be reported as secure, as long as the Encryption mode is not WEPDisabled. So WEP, WPA, etc. will all be reported as secure. |
| RemoteAccessPoint::UniqueID | The UniqueID of this RemoteAccessPoint. The UniqueID for RemoteAccessPoints is the SSID of the device. This ensures that we dont't have muliple devices with the same SSID. |
| RemoteAccessPoint::UseNetworkInformation | Gets whether or not this RemoteAccessPoint should use the NetworkInformation structure when it is connected to. |
| RemoteAccessPoint::APParameters | All of the paramters in the WLANAPParameters structure into this RemoteAccessPoint object. |
| RemoteAccessPoint::NetworkInformation | The NetworkInfo structure that this RemoteAccessPoint is using. |
| RemoteAccessPoint::KeyIndex | The Key Index for this RemoteAccessPoint. |
| RemoteAccessPoint::HexKey[ ] | The Hex Key for this RemoteAccessPoint. |
| RemoteAccessPoint::StringKey[ ] | The String Key for this RemoteAccessPoint. |
| RemoteAccessPoint::NetworkMode | The Network Mode for this Remote Access Point. |
| RemoteAccessPoint::Encryption | The Encryption mode for this Remote Access Point. |
| RemoteAccessPoint::AuthenticationMode | The Authentication mode for this RemoteAccessPoint. |
| RemoteAccessPoint::SupportedDateRates[ ] | The supported Data Rates for this RemoteAccessPoint. |
| RemoteAccessPoint::Connect( ) | This function will call it's local wifi device parent in order to connect to this device. This device must not be in a connected state, or this call will fail. |
| RemoteAccessPoint::Disconnect( ) | This function will disconnect, if the device is currently being reported as connected. The parent hardware variable must be set, because this function will require the parent local wifi device to perform the actual disconnect. |
| RemoteAccessPoint::RepairConnection( ) | This function will call its local wifi device parent, and ensure that this device is already connected. It will then disconnect, and reconnect. |
| RemoteAccessPoint::Unauthenticate( ) | This function will delete all keys stored on this device. Remove it from any auto connection list it may be within and change the state to unauthenticated. |

Exemplary attribute and operation descriptions for the concrete remote Wireless USB device object class 114 are contained in Table 9.

TABLE 8

| | |
|---|---|
| RemoteWirelessUSBDevice::AuthenticationPINCode | |
| RemoteWirelessUSBDevice::CDID | The CDID for this device |
| RemoteWirelessUSBDevice::CK | The CK for this device. |
| RemoteWirelessUSBDevice::SignalStrength | The signal strength for this device. |
| RemoteWirelessUSBDevice::RSSI | The signal strength for this device. |
| RemoteWirelessUSBDevice::DataTransferRate | |
| RemoteWirelessUSBDevice::USBDeviceType | The USB Device Type for this device. |
| RemoteWirelessUSBDevice::USBClassOfDevice | The USB device class for this device. |
| RemoteWirelessUSBDevice::DeviceSecurity | TRUE if this device is secure, which will always be returned, because all Wireless USB devices are secure. |
| RemoteWirelessUSBDevice::UniqueID | The Unique ID for this device, which is the CDID. |
| RemoteWirelessUSBDevice::Disconnect( ) | Disconnects from this device. This function will only succeed if this device is already connected, and has a valid parent local wireless usb device. |

D. Enumerate Available Remote Wireless Devices

Figure 12:
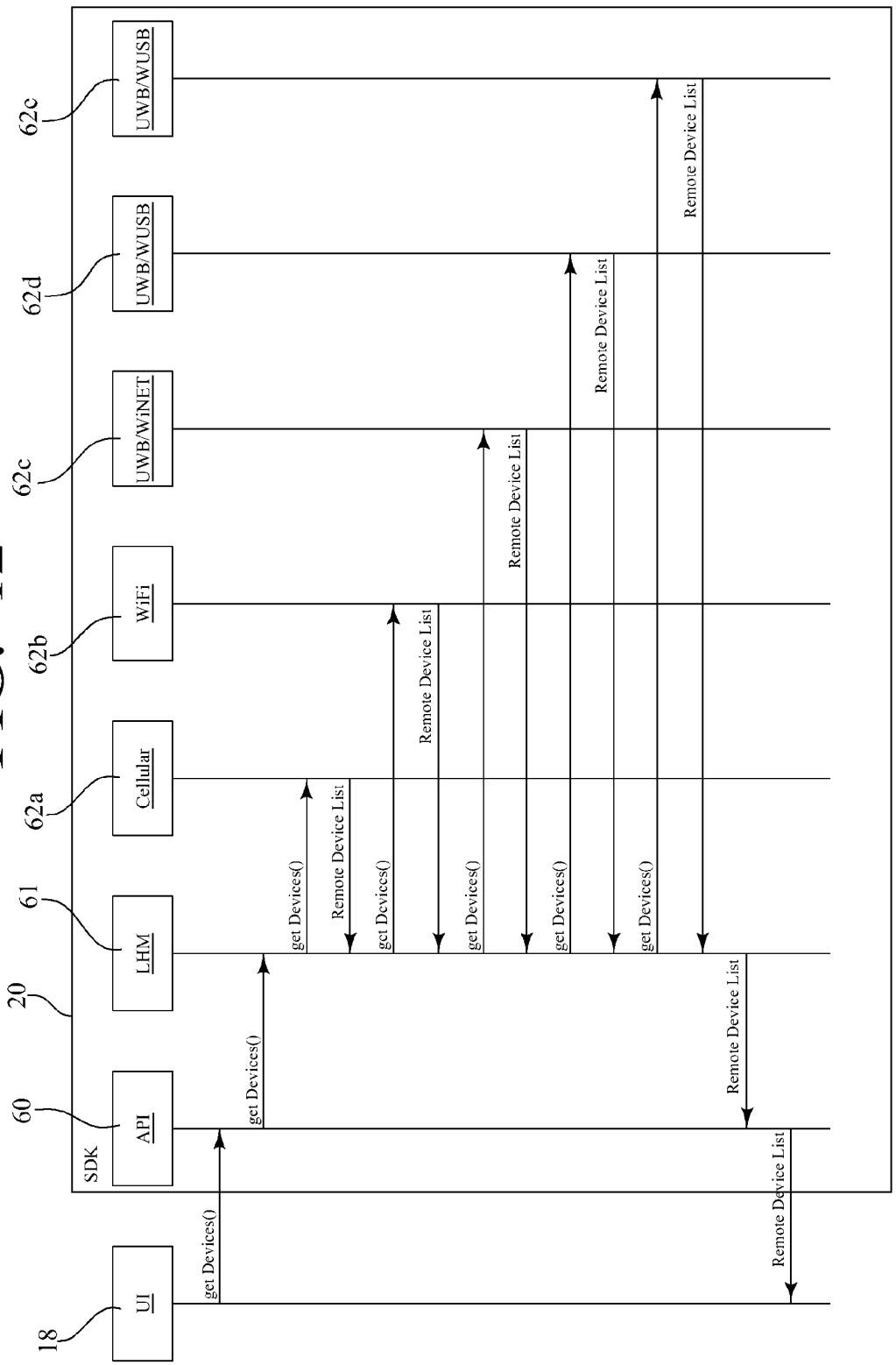
FIG. 12 is an exemplary time-sequence diagram for an "enumerate available remote wireless devices" function of an exemplary system and method for multi-radio control according to the invention.

FIG. 12 is an exemplary time-sequence or call-flow diagram for an "enumerate available remote wireless devices" function of an exemplary method for multi-radio control, according to the invention. As shown, the user interface application module 18 (or a third party application 24, FIG. 2) calls into the intermediate layer (SDK) module 20 via the program interface (API) module 60. The program interface module 60 sends a request to the local hardware manager module 61 to search for available remote wireless devices. The local hardware manager module 61 receives the request and formats a generic hardware interface request, and sends the generic hardware interface request to each adaptation layer module 62a-62e. Each adaptation layer module 62a-62e asynchronously generates appropriate driver commands to its associated radio driver module (22a-22g, FIG. 2). The radio driver modules then cause their associated radios to poll for available remote wireless devices, and return a list of the available remote wireless devices to the associated adaptation layer module 62a-62e. Each adaptation layer module 62a-62e then generates a generic response identifying the available remote wireless devices, and returns the generic response to the local hardware manager module 61, which provides a remote device list to the user interface application module 18 (or a third party application 24, FIG. 2) via the program interface (API) module 60.

E. Connect to Remote Wireless Device

Figure 13:
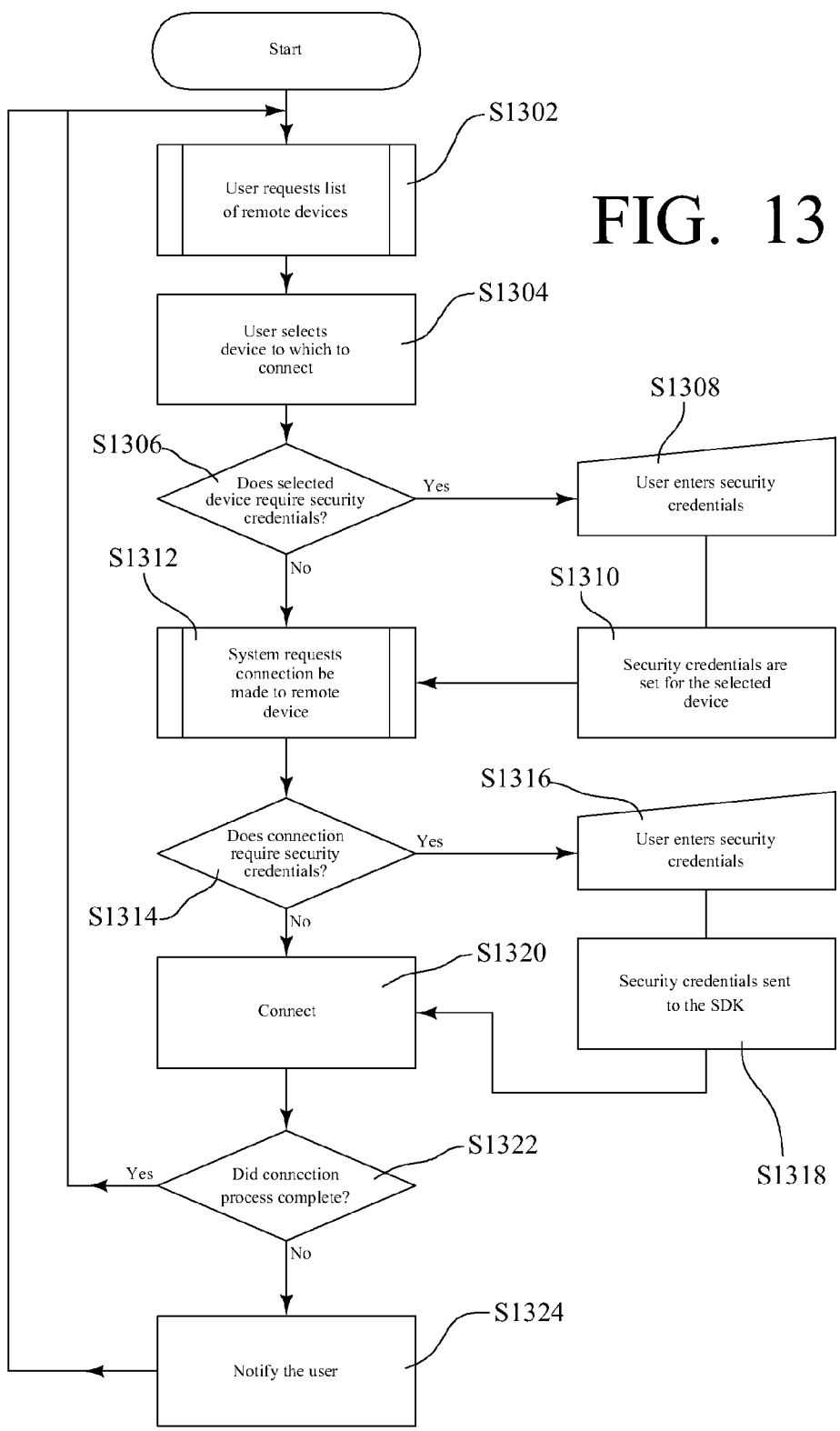
FIG. 13 is user connection flow chart for an exemplary method for multi-radio control according to the invention.

FIG. 13 is a user connection flow chart according to the invention, including the steps of: S1302 user requesting a list of available remote wireless devices; S1304 user selecting an available remote wireless device to which to connect; S1306 determining whether the remote wireless device requires security credentials to connect; if so, S1308 user entering security credentials; S1310 setting security credential for the selected device; S1312 requesting connection to remote device; S1314 determining whether the connection requires security credentials; if so, S1316 user entering security credentials; S1318 sending security credentials to the intermediate layer module; S1320 attempting to connect to the remote wireless device; S1322 determining whether the connection process was completed; if not, S1324 notifying the user and returning to step S1302, or, if so, returning to step S1302.

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A method for multi-radio control in a personal electronic device having a plurality of radios of disparate radio technologies, in an environment having at least one remote wireless device that is accessible through at least one of said plurality of radios, said method comprising:
    searching for remote wireless devices available for two-way wireless communication with each radio of said plurality of radios of disparate radio technologies in response to receiving an instruction from a user to search for available remote wireless devices;
    creating, in a user interface, selectable representations of the available remote wireless devices available for two-way wireless communication with each radio of said plurality of radios of disparate radio technologies in response to receiving information indicating the remote wireless devices that are available to each radio of said plurality of radios of disparate radio technologies; and
    establishing a connection with at least one of said remote wireless devices in response to receiving a request from said user to establish a connection with said at least one of said remote wireless devices;
    wherein said step of searching for remote wireless devices includes:
    formatting a generic hardware interface request to search for available remote wireless devices;
    generating specific driver commands to each radio to search for available remote wireless devices based on said generic hardware interface request;
    sending said specific driver commands to a radio driver module associated with each radio; and
    receiving information indicating available remote wireless devices to each radio from each radio driver module.

2. The method for multi-radio control of claim 1, further including receiving a disconnect request from said user to disconnect from a remote wireless device, and, responsive to receiving said disconnect request, disconnecting said remote wireless device from the radio to which the remote wireless device is connected.

3. The method for multi-radio control of claim 1, further including receiving a notification of a change in state of said connection between said personal electronic device and said remote wireless device from the associated radio driver module, and presenting said notification of a change in state of said connection to said user.

4. The method for multi-radio control of claim 1, further including determining whether access to the remote wireless device to which the user has requested connection requires security credentials, and, if so, requesting security credentials for access to the remote wireless device from said user, and providing security credentials for access to the remote wireless device for said user in response to receiving said security credentials from said user.

5. The method for multi-radio control of claim 4, further including determining whether a service offered by the remote wireless device to which the user has requested connection requires security credentials, requesting security credentials from said user for the service offered by said remote wireless device, and providing security credentials for said user for the service offered in response to receiving said security credentials for the service offered from said user.

6. A method for multi-radio control in a personal electronic device having a plurality of radios of disparate radio technologies in an environment having at least one remote wireless device that is accessible through at least one of said plurality of radios, said method comprising:
    receiving a request from a user to search for remote wireless devices that are available for two-way wireless communication with each radio;
    formatting a generic hardware interface request to search for available remote wireless devices;
    generating specific driver commands to each radio of said plurality of radios of disparate radio technologies to search for available remote wireless devices based on said generic hardware interface request;
    sending said specific driver commands to a radio driver module associated with each radio;
    receiving information indicating available remote wireless devices to each radio from each radio driver module; and
    creating, in a user interface, selectable representations of the remote wireless devices available for two-way wireless communication with each radio of said plurality of radios of disparate radio technologies without regard to the radios of disparate radio technologies to which the remote wireless devices are available.

7. The method for multi-radio control of claim 6, further including receiving a request from said user to connect to a remote wireless device selected from said available remote wireless devices, and establishing a connection between said personal electronic device and said remote wireless device using the radio to which the remote wireless device is available.

8. The method for multi-radio control of claim 7, further including receiving a request from said user to disconnect from a remote wireless device, and disconnecting said remote wireless device from the radio to which the remote wireless device is connected.

9. The method for multi-radio control of claim 7, further including receiving a notification of a change in state of said connection between said personal electronic device and said remote wireless device from the associated radio driver module, and presenting said notification of a change in state of said connection to said user.

10. A system for multi-radio control in a personal electronic device having a plurality of radios of disparate radio technologies, each said radio having an associated radio driver module, in an environment having remote wireless devices, said system comprising:
- a program interface module for receiving requests from an interfaced third party application program regarding said remote wireless devices and providing responses to said requests;
- a local hardware manager module for:
- receiving requests from said program interface module to search for available remote wireless devices;
- formatting generic hardware interface requests for each radio to search for available remote wireless devices;
- receiving generic responses to said generic hardware interface requests and
- providing said responses to said program interface module; and
- an adaptation layer module associated with each radio, each adaptation layer module:
- receiving said generic hardware interface requests to search for available remote wireless devices from said local hardware manager module;
- generating specific driver commands to said associated radio driver modules to search for available remote wireless devices based on said generic hardware interface requests;
- sending said specific driver commands to said associated radio driver modules;
- receiving specific responses indicating available remote wireless devices to each radio from said radio driver modules;
- generating generic responses based on said specific responses; and
- providing said generic responses to said local hardware manager module.

11. The system for multi-radio control of claim 10, further comprising a remote device manager module for managing remote device objects for available remote wireless devices.

12. The system for multi-radio control of claim 11, further comprising a user interface application module for:
- receiving a request from a user to change the connection status of at least one of said available remote wireless devices;
- sending said request to change the connection status of said at least one of said available remote wireless devices to said program interface module;
- receiving a response to said request to change the connection status of said at least one of said remote wireless devices from said program interface module; and
presenting said response to said user.

13. The system for multi-radio control of claim 12, wherein said user interface application module is further for receiving notifications of a change in status of a connection between said personal electronic device and a remote wireless device, and presenting said notification of a change in state of said connection to said user.

14. The system for multi-radio control of claim 12, wherein said request from a user to change the connection status of at least one of said available remote wireless devices is a request to connect to one of said available remote wireless devices, wherein said user interface application module is further for determining whether access to said one of said available remote wireless devices requires security credentials, and, if so, requesting security credentials from said user.

15. A system for multi-radio control in a personal electronic device having a plurality of radios of disparate radio technologies, said system comprising:
- searching means for searching for remote wireless devices available for two-way wireless communication with each radio of said plurality of radios of disparate radio technologies, in response to receiving an instruction from a user to search for available remote wireless devices;
- indicating means for indicating creating, in a user interface, a selectable representation of the available remote wireless devices available for two-way wireless communication with each radio of said plurality of radios of disparate radio technologies in response to receiving information indicating the remote wireless devices that are available to each radio of said plurality of radios of disparate radio technologies; and
- connection means for establishing a connection with at least one of said available remote wireless devices in response to receiving request from the user to establish a connection with said at least one of said remote wireless devices; wherein said searching means for searching for remote wireless devices includes means for:
- formatting a generic hardware interface request to search for available remote wireless devices;
- generating specific driver commands to each radio to search for available remote wireless devices based on said generic hardware interface request;
- sending said specific driver commands to a radio driver module associated with each radio; and
- receiving information indicating available remote wireless devices to each radio from each radio driver module.

16. The system for multi-radio control of claim 15, further including means for disconnecting from said at least one of said remote wireless devices in response to receiving an instruction to disconnect from said at least one of said remote wireless devices.

17. The system for multi-radio control of claim 15, further including means for communicating notifications of changes in state of said connection with said at least one of said remote wireless devices in response to receiving a notification of a change in state of said connection.

18. A system for multi-radio control in a personal electronic device having a plurality of radios of disparate radio technologies, each of said plurality of radios having an associated radio driver module, said system comprising:
- an intermediate layer module having an program interface module, a local hardware manager module, an adaptation layer module associated with each of said plurality of radios, and a remote device manager module, wherein:
- said program interface module:
- receives a request to search for remote wireless devices that are available to each of said plurality of radios;
- sends a request to said local hardware manager module to search for remote wireless devices that are available;
- receives a list of available remote wireless devices; and
- instantiates a remote device object for each remote device that is available;
- said local hardware manager module:
- receives said request to search for available remote wireless devices from said program interface module;
- formats a generic hardware interface request to search for available remote wireless devices; and
- sends said generic hardware interface request to search for remote wireless devices to each adaptation layer module;
- each adaptation layer module:
- receives said generic hardware interface request to search for remote wireless devices;

generates appropriate driver commands to each said associated radio driver module to search for available remote devices;

receives a list of available remote devices from each said associated radio driver module; and sends said list of available remote devices to said local hardware manager module;

said remote device manager module manages said remote device objects for said available remote devices; and a user interface application module configured for:

receiving a request from a user to view remote wireless devices that are available for two-way wireless communication with said personal electronic device using said plurality of radios of disparate radio technologies;

sending a request to search for remote wireless devices to said intermediate layer module;

receiving information indicating the remote wireless devices that are available to said personal electronic device from said intermediate layer module;

creating selectable representations of the remote wireless devices available for two-way wireless communication with each radio of said plurality of radios of disparate radio technologies;

receiving a request from said user to connect to a selected remote wireless device; and connecting said personal electronic device to said selected remote wireless device.

19. The system for multi-radio control of claim 18, wherein said user interface application module is further for receiving a request from a user to disconnect from a selected remote wireless device, and, responsive to receiving said disconnect request, disconnecting from selected remote wireless device.

20. The system for multi-radio control of claim 18, wherein:

one of said adaptation layer modules receives a specific notification of a change in state of one of said plurality of radios from said associated radio driver module, formats a generic notification of said change in state of said one of said plurality of radios, and sends said generic notification to said local hardware manager module;

said local hardware manager module receives said generic notification of said change in state of said one of said plurality of radios and sends said generic notification to said user interface application module; and said user interface application module communicates said notification of change in state of said one of said plurality of radios to said user.

* * * * *

UNITED STATES PATENT AND TRADEMARK OFFICE
CERTIFICATE OF CORRECTION

| | | |
|---|---|---|
| PATENT NO. | : 8,504,100 B2 | Page 1 of 1 |
| APPLICATION NO. | : 11/751903 | |
| DATED | : August 6, 2013 | |
| INVENTOR(S) | : Christopher M. Songer et al. | |

It is certified that error appears in the above-identified patent and that said Letters Patent is hereby corrected as shown below:

IN THE CLAIMS:
In Claim 1 at Column 17, Line 41, delete the first instance of "available".

In Claim 10 at Column 19, Line 13, insert a --;-- after "face requests".

In Claim 15 at Column 20, Line 5, delete the second instance of "indicating".
In Claim 15 at Column 20, Line 6, delete "available".

Signed and Sealed this
Twelfth Day of November, 2013

Teresa Stanek Rea
*Deputy Director of the United States Patent and Trademark Office*